United States Patent

Davis et al.

[11] Patent Number: 5,807,175
[45] Date of Patent: Sep. 15, 1998

[54] DYNAMIC DETECTION OF PLAYER ACTUATED DIGITAL INPUT DEVICES COUPLED TO A COMPUTER PORT

[75] Inventors: Jeffrey A. Davis, Bothell; Matthew J. Stipes, Woodinville, both of Wash.

[73] Assignee: Microsoft Corporation, Redmond, Wash.

[21] Appl. No.: 783,691

[22] Filed: Jan. 15, 1997

[51] Int. Cl.[6] .................................................. A63F 9/22
[52] U.S. Cl. ........................................ 463/36; 273/148 B
[58] Field of Search ................................... 395/651, 652, 395/653, 828, 830, 832, 833, 882, 883, 892, 893, 894; 463/36, 37, 38, 39, 43, 44; 345/156, 157, 161, 163, 167, 168, 173; 273/148 B

[56] References Cited

U.S. PATENT DOCUMENTS

| 5,245,320 | 9/1993 | Bouton ........................... 273/148 B X |
|---|---|---|
| 5,247,682 | 9/1993 | Kondou et al. . |
| 5,410,535 | 4/1995 | Yang et al. . |
| 5,517,646 | 5/1996 | Piccirillo et al. . |
| 5,630,170 | 5/1997 | Koizumi et al. . |
| 5,671,368 | 9/1997 | Chan et al. . |
| 5,675,748 | 10/1997 | Ross . |
| 5,675,825 | 10/1997 | Dreyer et al. . |
| 5,682,529 | 10/1997 | Hendry et al. . |
| 5,732,283 | 3/1998 | Rose et al. . |

*Primary Examiner*—Jessica Harrison
*Assistant Examiner*—Michael O'Neill
*Attorney, Agent, or Firm*—Ronald M. Anderson

[57] ABSTRACT

Digital input devices are automatically identified when attached to a game port, serial port, or parallel port of a personal computer, without requiring user interaction. In a disclosed embodiment, a digital game pad is connected to the game port of a personal computer and includes a device port for connecting other input devices, including another digital game pad, a digital joystick, or an analog input device. A polling request is implemented by a class driver to detect a digital input device and to determine its type. A class driver calls a device detection function that successively checks for registered devices in a list. A minidriver for each class of device is responsible for determining if the type of device with which it is used is attached to the port. Once the connected device is identified, the operating system registry is updated with the ID of the connected device. When a digital input device is disconnected, the system responds by removing its ID from the registry and removing any drivers that are no longer required.

31 Claims, 5 Drawing Sheets

DYNAMIC DETECTION OF PLAYER ACTUATED DIGITAL INPUT DEVICES COUPLED TO A COMPUTER PORT

FIELD OF THE INVENTION

The present invention generally relates to transfer of data between an input device and a computer port, and more specifically, pertains to the bi-directional transfer of data between a personal computer and a device coupled to either an RS-232 serial port, a parallel port, or a game port of the computer.

BACKGROUND OF THE INVENTION

The utility of personal computers is greatly enhanced by the ability to connect a computer to external devices that provide input data or are controlled by the computer. Data are typically transferred bi-directionally between a data bus of a computer and an external device such as a printer through either a parallel port or a serial port. However, other types of ports are also used for data transfer, including game ports. Although pointing devices such as a mouse or track ball are typically designed to connect to a serial port for manipulating a cursor on a display screen, such devices are not well adapted for use in providing input to games. A mouse or track ball simply does not provide the manipulative control required for efficiently playing most action games. In contrast, a joystick or game pad can be held in the hand and more efficiently employed to control graphic objects on a display screen. For certain types of games or even certain portions of a specific game, the joystick is the superior control device, while in other cases, a game pad is better.

The game port on a personal computer is primarily intended for connecting a joystick or game pad to the computer to enable a user to manipulate objects in games being executed by the central processor of the computer. On an IBM™ compatible computer, the game port is typically responsive to analog signals. A conventional joystick varies an analog input voltage applied to the game port relative to two or more axes along which the control stick of the joystick is moved. Additional analog signal lines are typically provided on the joystick lead to convey voltage levels indicative of the state of one or more switches on the joystick. These switches are actuated by a user to select an option in a game, such as to fire a cannon or a laser, or launch a missile graphically displayed on the computer screen.

One of the problems with conventional analog input devices arises due to variations in the voltage levels corresponding to discrete positions of the joystick or game pad controls. Because of variations in potentiometer resistance, inherent inaccuracy, and environmental effects, the voltage levels corresponding to the position of the analog control element are likely to be slightly different from joystick to joystick, even those of the same manufacture and model. Changes can occur in these variables each time that a joystick is used. The accuracy of a typical joystick potentiometer is only about ±10 percent, and the angular tolerance is about ±5° or more. Consequently, it is often necessary to recalibrate an analog joystick each time that a game is played in which the joystick is used as the input device. The calibration procedure checks the voltage provided by the joystick when the controller is moved to specified positions (e.g., full upper left corner) and normally requires several minutes to complete.

To address the problems of accuracy and retention of calibration that arise in analog joysticks and game pads, a digital joystick has been developed by Microsoft Corporation and is sold under the trademark SIDEWINDER 3D PRO. The digital joystick detects the position of a control stick in two orthogonal directions (x and y axes) and rotationally about a vertical z axis. An optical position detection circuit having a pair of light sources is mounted on the control stick so that a four-quadrant photodetector assembly disposed opposite the light sources detects light from the sources to determine the position of the control stick. A mechanical three-dimension to two-dimension converter assembly converts arcuate movement of the control stick to two-dimensional movement of the light sources. A microprocessor disposed within the joystick housing employs trigonometric techniques to determine the position and rotational orientation of the handle, producing coordinates that are supplied to the computer to which the joystick is coupled. Also included on the joystick are a plurality of switches that determine control state (binary) signal levels and a slider that produces a variable digital signal. A primary benefit of this joystick arises from its digital implementation. Because the digital joystick does not rely upon variable potentiometers to sense position, as in conventional analog joysticks, the joystick does not change calibration. The output signal from the digital joystick remains constant, independent of the specific digital joystick coupled to the game port and is substantially unaffected by temperature and other typical environmental parameters.

Dedicated game consoles that employ television sets as displays represent an alternative to the personal computer for playing games. Many games played on a game console are intended to be played by multiple players who either compete against each other or against the game console processor. However, because of the number of computers that have been sold for use in the home, there is a clear commercial motivation to rewrite successful games originally written for a game console to run on a personal computer, thereby expanding the market for the game software. However, the personal computer game port has typically provided very poor support for multiple players compared to dedicated game consoles. In response to the demand for enabling multiple players to play games on the personal computer, devices such as Gravis Corporation's GRIP MULTIPORT™ game port have been developed that accept multiple joysticks or game pads. Each joystick or game pad is plugged into one of the multiple ports provided on the device, so that each player is able to interact in a multiplayer game played on the personal computer. however, each time that a joystick or game pad is connected to or disconnected from to the multiple game port device, or a change occurs in the type of game control devices that are being used, it will most likely be necessary to reboot the personal computer, and each of the analog game controllers in use will likely need to be recalibrated.

Clearly, the time required to change the configuration of the input devices being used for controlling a game played on a personal computer delays the onset of play and interferes with the player's enjoyment of a game. Ideally, a change in the game controller configuration should be possible without requiring any interaction with a displayed control panel or any recalibration or user input to indicate the number and type of game control devices being used. It should be possible to connect or disconnect a digital joystick or digital game pad from a game port without such user interaction. The personal computer, with the cooperation of the control device(s) and system software, should be able to: (a) detect whether a controller has been connected or disconnected to communicate with a game port; (b) determine if the controller is of the above-described digital type so that no recalibration is required; and, (c) should be able to provide an indication to the game software of whether recalibration of the controller is required. Currently, no prior art device or system provides these desirable features.

It would similarly be desirable to extend the capability to detect and accept changes in the input device connected to other types of conventional data ports, such as the RS-232 serial ports and the parallel port found on most personal computers. Both the serial port and the game port are intended to convey digital data and can be used for connection of gaming devices and other devices that produce the appropriately formatted digital data signals required by the port. The prior art does not disclose the ability of such ports to automatically detect the types of digital devices that are connected thereto and to provide the appropriate interface for the connected device.

SUMMARY OF THE INVENTION

In accord with the present invention, a method is defined for automatically reconfiguring an operating system of a computer after any of a plurality of different types of digital input devices is coupled to or decoupled from, either a serial port, a parallel port, or a game port of the computer, so that the operating system recognizes the change. The method includes the step of providing a software interface that universally accepts input signals applied to the port by each of the different types of digital input devices. Each of the digital input devices currently connected to the port (and active) is automatically detected, and its type is automatically identified from among the plurality of different types. Without requiring the computer to be rebooted, the input signal received through the port from each input device detected is processed as appropriate for that type of input device, to provide an application input signal.

The plurality of different types of digital input devices that are automatically detected include a digital joystick and a digital game pad. Preferably, the step of automatically identifying includes the step of polling each digital input device coupled to the port using a defined format that is employed for communication with a specific type of digital input device. If the step of polling fails to elicit an expected response from the specific type of digital input device being polled, a fail indication is returned. Conversely, if the step of polling elicits the expected response from the specific type of the digital input device being polled, a driver corresponding to said specific type of digital input device is employed for processing the input signal from that digital input device. To ensure that the type of digital input device is properly determined, the polling is repeated a predefined number of times or until the expected response is elicited, whichever occurs first.

In a preferred form of the invention, up to a predefined number of digital input devices of a specific type can be coupled to the port. An operating system running on the computer stores an identification for each digital input device that is currently coupled to the port.

The method further preferably includes the step of determining when an input device that is not among the plurality of different types of digital input devices is coupled to the port. Preferably, the digital input devices are coupled in a daisy chain configuration, but the digital input devices are processed in parallel. A first of the digital input devices is directly coupled to the port, and each successive digital input device is coupled to a port disposed on a previous digital input device in the daisy chain configuration. The interface software communicates with each digital input device in the daisy chain configuration without regard to the relative position of the digital input device in the daisy chain configuration. The method further comprises the step of responding to a mode switch on the first of the digital input devices to indicate that a different input device, which is coupled to the first digital input device, is providing the input signal. Again, an input device coupled to the first of the digital input devices is automatically detected, but its type is not automatically identified if the input device is not one of the plurality of different types of digital input devices.

Another aspect of the present invention is directed to a system for automatically communicating with any of a plurality of different types of digital input devices that are coupled to or decoupled from a port of a computer. The system includes a processor for executing machine instructions that comprise an operating system. Further, the machine instructions comprise a software interface that universally accepts input signals applied to the port by the plurality of different types of digital input devices. A memory is coupled to the processor for storing the machine instructions. These machine instructions cause the processor to implement functions that are generally consistent with the steps of the method described above.

Similarly, yet another aspect of the present invention is directed to an article of manufacture adapted for use with a computer, for causing the computer to respond automatically to a change of configuration after any of a plurality of different types of digital input devices is coupled to or decoupled from a port of the computer. The article of manufacture comprises a memory medium adapted to be used with the computer. A plurality of machine instructions are stored on the memory medium to implement a software driver interface that universally accepts input signals applied to the port by each of the plurality of different types of digital input devices and causes the computer to effect functions that are also generally consistent with the steps of the above method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 5:
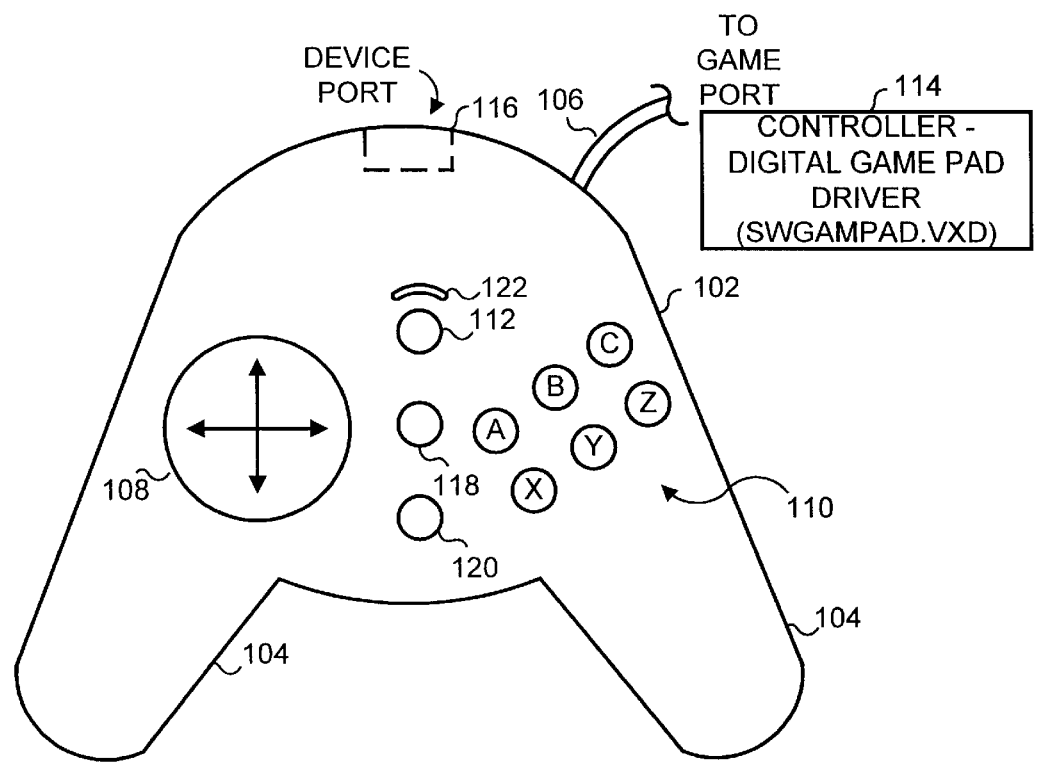
FIG. 5 is a block diagram of a digital game pad controller that couples to a game port for use with the present invention.

As noted above, the present invention is directed to enabling a digital input device to be automatically detected and recognized by the operating system when the device is connected to or disconnected from a game port, a serial port, or a parallel port of a personal computer. Further, the digital input device can be connected to the personal computer without requiring that the system be rebooted in order to have the input device recognized. An example of such an input device is illustrated in FIG. 5. This FIGURE schematically shows a digital game pad 100 that is designed for producing signals used to control graphic objects on a personal computer to which the digital game pad is coupled. The game pad is sold by Microsoft Corporation under the trademark SIDEWINDER™. Game pad 100 includes a housing 102 that is generally shaped like an inverted "V," with handles 104 on opposite sides of the main body of the housing. Handles 104 are designed to be grasped in either hand while the user's fingers (not shown) actuate controls on the digital game pad. These controls include a directional pad 108 that can be depressed to move a cursor or other graphic object in the x/y directions, depending upon the portion of periphery of directional pad 108 that is depressed. The directional pad is thus generally analogous in function to the control stick of a joystick. In addition, a plurality of control buttons 110 are included for selecting other control options. For example, control buttons 110 can be assigned to different control functions normally entered on the keyboard. In addition, digital game pad 100 includes three buttons 112, 118, and 120 that are centrally disposed on the top of housing 102. Button 120 is analogous to the "Shift" key on a computer keyboard and is depressed with any other button on the digital game to select an alternative function for the other button that depends on the programming of the game or application with which the digital game pad is being used. Button 118 is used for starting an application or game (if the application or game program supports that function), and button 112 comprises a mode button that selects the digital game pad as the active control device, or places the digital game pad in a "pass through" mode so that a different type of input device, which is coupled through the digital game pad to the port of the computer, serves as the active control device. An arcuate shaped indicator light 122 glows when digital game pad 100 is activated to provide a control signal to the computer, but is not lighted when the mode button toggles the other device as active.

Within housing 102 is disposed a controller that is programmed to communicate with the computer port using digital packets. The digital packets produced by the digital game pad have a specific format that identifies the digital game pad as the type of digital input device coupled to the game port (or other port) of the computer. In the preferred embodiment, the software driver executing on the computer that processes the digital packets produced by the digital game pad is referred to as "SWGAMPAD.VxD." (The first portion of the driver name is an acronym for "Sidewinder™ Game Pad.")

Unlike most other input devices currently available, digital game pad 100 includes a device port 116 having the same pin or terminal configuration as that used for the game port of a personal computer. Device port 116 accepts a game port plug (not shown) that is coupled to another digital game pad or a digital joystick (such as Microsoft Corporation's SIDEWINDER PRO™). In addition, an analog input device, such as a conventional analog joystick, can be plugged into device port 116 for use in controlling a game or other application executing on a personal computer to which digital game pad 100 is coupled via a lead 106. While the preferred embodiment of digital game pad 100 is designed specifically to couple to the computer through a conventional game port, it is also contemplated that the device can readily be modified to connect to the serial port or parallel port of the computer, while still retaining the ability to be connected and disconnected from that port without requiring any entry to be made in a software control panel by the user, or requiring the personal computer to be rebooted in order to recognize that such changes have occurred.

Figure 6:
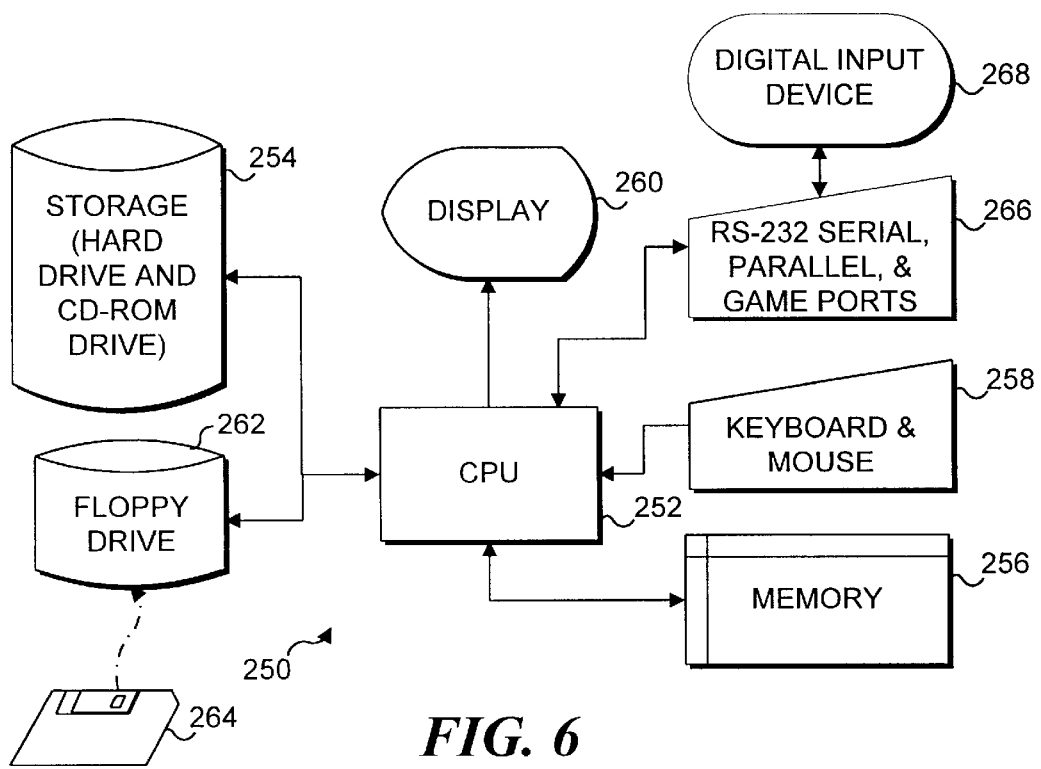
FIG. 6 is a block diagram of a personal computer system for implementing the present invention.

With reference to FIG. 6, components of a computer system suitable for implementing the present invention are illustrated. In this block diagram, a central processing unit (CPU) 252 is coupled to a storage device 254, e.g., a hard drive and/or a CD-ROM drive. The hard drive is used for storing application programs and data. Similarly, the CD-ROM drive can also be used for storing applications and data that are read from a CD-ROM disk (not shown). Alternatively, application programs and/or data can be provided on a floppy disk 264, which is inserted into a floppy drive 262. Machine instructions comprising a software program are read from floppy disk 264 and typically stored on the hard drive. The present invention uses software that will likely be conveyed to computer either on a floppy disk 264 or on a compact disk-read only memory (CD-ROM). Once stored on the hard drive, the software program comprising the machine instructions can later be executed by the user. Typically, the present invention will be installed using a set-up routine, as is commonly done for applications loaded from floppy disks or CD-ROM. Once the file(s) that include the machine instructions comprising the drivers and other related programs are stored in one or more appropriate folders on the hard drive, these instructions become available any time that CPU 252 is required to execute applications that may use an input device such as digital game pad 100, which can be coupled to or disconnected from the computer without user interaction or rebooting. A block 256 represents both read only memory, which is used during the boot-up of the computer, and random access memory, used to provide volatile storage for temporary data and to hold the machine instructions for execution by CPU 252.

A display 260 is also coupled to CPU 252 and comprises a display screen on which graphics are rendered when an application is executed by CPU 252. Also connected to CPU 252 are a keyboard and mouse, as indicated in a block 258.

A digital input device 268, which generally represents any type of digital device having the capabilities of the present invention, is shown in FIG. 6. The digital input device is coupled to an RS-232 serial port, a parallel port, or a game port, as indicated in a block 266. This block represents a hardware interface having an appropriate connector for the digital input device so that it can be connected to the personal computer. Not shown is the software interface comprising the appropriate software drivers that are used to communicate with each specific type of digital input device. As indicated, block 266 is bidirectionally directionally coupled to CPU 252 so that input commands processed by the software driver can be provided to the CPU from the port and so that the CPU can provide control signals that are processed by the appropriate software driver as required for input to the digital input device. When machine instructions comprising an application or drivers employed by the present invention are executed by the personal computer, the machine instructions are loaded from the hard drive (or floppy drive) into the RAM of the personal computer. The present invention will typically be used in connection with games running on the personal computer.

Figure 1:
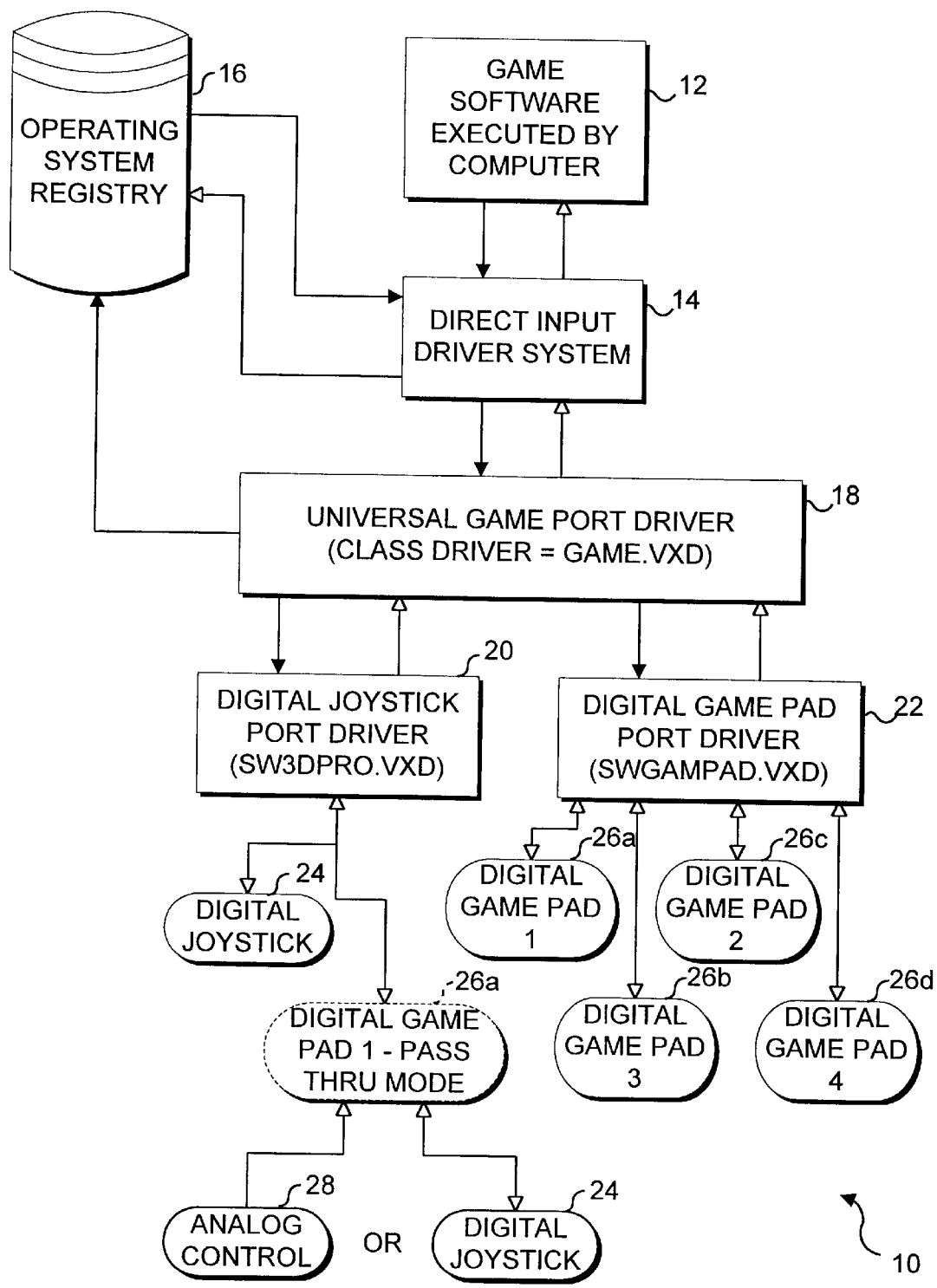
FIG. 1 is a functional block diagram of a system in accord with the present invention, for automatically detecting and identifying a digital input device that is coupled to a port of a personal computer.

Turning now to FIG. 1, a block diagram 10 illustrates the options for coupling one or more digital game pads 26*a* through 26d, or a digital joystick 24, or an analog input device 28 to the game port (or serial port, or parallel port) of a personal computer. Since, as already noted, the preferred embodiment of the present invention is designed for coupling the digital input device to the game port, FIG. 1 illustrates details of that embodiment. In this diagram, game software being executed by the computer is indicated in a block 12. However, it should be understood that the present invention is not limited to use in connection with games, but can be used with other types of applications for which the digital game pad or other input device is used to provide controlling input signals so that the user can control graphic objects and make selections within the application running on the computer. The game software being executed in the example illustrated in FIG. 1 comprises machine instructions that are executed by the CPU causing the CPU to issue commands that are input to a direct input driver system in a block 14. The direct input driver system sends data back to the game software being executed by the computer corresponding to the user input applied through the digital game pad(s), digital joystick, or analog input device coupled to the port of the computer.

In the preferred embodiment of the present invention, the direct input driver system executes under Microsoft Corporation's Windows 95™ operating system and handles the calls for input from the game software being executed on the computer. The direct input driver system sends the user input data received from the input device to the game program. In addition, the direct input system is coupled to the operating system registry, as indicated in a block 16. The registry keeps track of the identification of the active input device(s) coupled to the port of the computer and various other parameters that are specific to each type of input device.

The direct input driver system loads a universal game port driver, as provided in a block 18. In the preferred embodiment, the universal game port driver is "GAME.Vx D;" it encapsulates all digital joystick and digital game pad service devices into one single class driver and loads and unloads device mini drivers that are specific to each different type of digital input device. The direct input driver system in block 14 also communicates data to the operating system registry. In the preferred embodiment, the operating system registry is the Windows 95 registry, and through updates provided from the universal game port driver, the operating system registry tracks the currently active game device, referencing it by its ID number. Also stored in the registry are calibration information and device capabilities for each specific type of input device, such as the number of buttons, axes, and axis extent (i.e., the minimum, maximum, and center position) for the currently active input device. It should be noted that as additional game pads are coupled to the port of the computer in a daisy chain configuration as described below, the first such digital game pad is assigned ID 1, the second ID 2, etc., so that each digital game pad internally retains its assigned ID. By reference to the ID assigned to the digital game pads, the game application and operating system can determine which digital input device is providing input data and can send control signals to a specific one of the connected digital input devices.

The universal game port driver in block 18 processes all digital packets input from either the digital joystick or digital game pad. The universal game port driver unloads if an analog input device, such as an analog joystick, is coupled to device port 116 of the digital game pad connected to the game port (and if the mode switch on the game pad is activated make the analog input device controlling). The user will then be required to identify the type of analog input device, likely be required to recalibrate it, and may be required to reboot the personal computer to enable the analog input device to be used to control the game or other application. The universal game port driver provides dynamic device detection for all digital input devices having certain characteristics, including an appropriate data packet format and plug-and-play capabilities. For purposes of uniformity, the universal game port driver will detect all digital gaming devices produced by Microsoft Corporation and handle the data packets used to communicate user input actions from the digital input devices to the application executing on the personal computer.

A digital game pad port driver (SWGAMPAD.VxD) in a block 22 packetizes and validates data provided to the universal game port driver by the digital game pad and receives control signals generated by the program controlling the digital game pad that are conveyed through the universal game port driver. The digital game pad port driver is a minidriver that provides these and other services for the universal game port driver.

From one to four digital game pads 26a through 26d are connected in parallel to the digital game pad port driver, which processes the bi-directional data signals received from each digital game pad. The preferred embodiment enables from one to four of the digital game pads to be connected in a daisy chain arrangement. In this daisy chain arrangement, lead 106 of first digital game pad 26a is directly plugged into the game port. The lead from second digital game pad 26b (if used) is plugged into the device port on the first digital game pad. Similarly, the lead of third digital game pad 26c (if used) is plugged into device port 116 of second digital game pad 26b. Finally, fourth digital game pad 26d (if used) is plugged into the device port on the third digital game pad. Although it physically appears that the digital game pads are connected in series within the daisy chain arrangement, the data packets that they produce are processed in parallel by the digital game pad port driver so that none of the digital game pads has any time advantage or priority over any other digital game pad connected in the arrangement. Each time that another digital game pad is connected to the device port of a previously connected digital game pad, it is polled, its type is recognized, and its ID is entered into the operating system registry as being one of the up to four active digital game pads. If the last connected digital game pad is then disconnected, the operating system registry takes note that the ID of the now disconnected digital game pad is no longer active.

Because of the digital nature of the digital game pads, there is no requirement for calibration of the directional pad on the device. The minimum and maximum data for the directional pad on each digital game pad is the same and remains unchanged, independent of environmental factors such as temperature and shock. Consequently, there is no need to initiate a recalibration each time that a digital game pad is reconnected to the digital game pad port driver.

Instead of digital game pad 26a being connected to the game port of the personal computer, digital joystick 24 can be directly connected thereto. When connected to the game port, the digital joystick communicates with the universal game port driver using a minidriver, i.e., a digital joystick port driver as indicated in a block 20. This minidriver driver (SW3DPRO.VxD) packetizes and validates output data from digital joystick 24 that are transferred to the universal game port driver, processes program control signals provided to the digital joystick, and performs other services for the universal game port driver.

Instead of being connected directly to the game port, digital joystick 24 can alternatively be coupled to the device port of first digital game pad 26a. In this case, mode switch 112 (shown in FIG. 5) is used to select either the first digital game pad as the active control device or digital joystick 24 as the active control for providing user input to the application being executed on the personal computer. Mode switch 112 toggles between the digital game pad and any input device plugged into the device port of the digital game pad each time that the mode switch is depressed. If the mode switch selects digital joystick 24, the signals produced by the digital joystick pass through first digital game pad 26a and are processed by the digital joystick port driver in block 20. In this case, the digital game pad port driver in block 22 is not needed, since the digital game pad is not active. However, by simply depressing the mode switch, the user can select digital game pad 26a as active for use in controlling, rather than digital joystick 24. The ability to selectively switch between the first digital game pad and the digital joystick (or other appropriate digital input device) in this manner enables the user to play games or use other applications in which parts of the application or game are best controlled by input provided by the digital game pad, while other parts of the game or application are better controlled by use of input provided by the digital joystick or other type of digital input device that is plugged into the device port of the first digital game pad. It should be noted that only one digital joystick can be connected to the game port of the personal computer through the first digital game pad, and that the digital joystick can only be plugged into the device port of the first digital game pad that is connected to the game port of the personal computer.

As a further alternative, analog input device 28 can be coupled through the device port of first digital game pad 26a, which simply passes the analog signals produced by the analog device to the direct input driver system. However, analog control 28 will likely require recalibration when it is initially connected to the game port. Furthermore, some software applications may require that the program using the analog input device be restarted or even that the computer be rebooted to accommodate the new connection of the analog input device. Since the analog input device does not produce the digital signals that the digital game pad and digital joystick provide, when it is selected, the digital joystick port driver, the digital game pad port driver, and the universal game port driver are unloaded so that an appropriate analog device driver can be employed to process the signals produced by the analog input device. Often, the application executing on the computer that employs the user input supplied from by the device will include a driver for processing the control signals produced by the analog input device.

Figure 2:
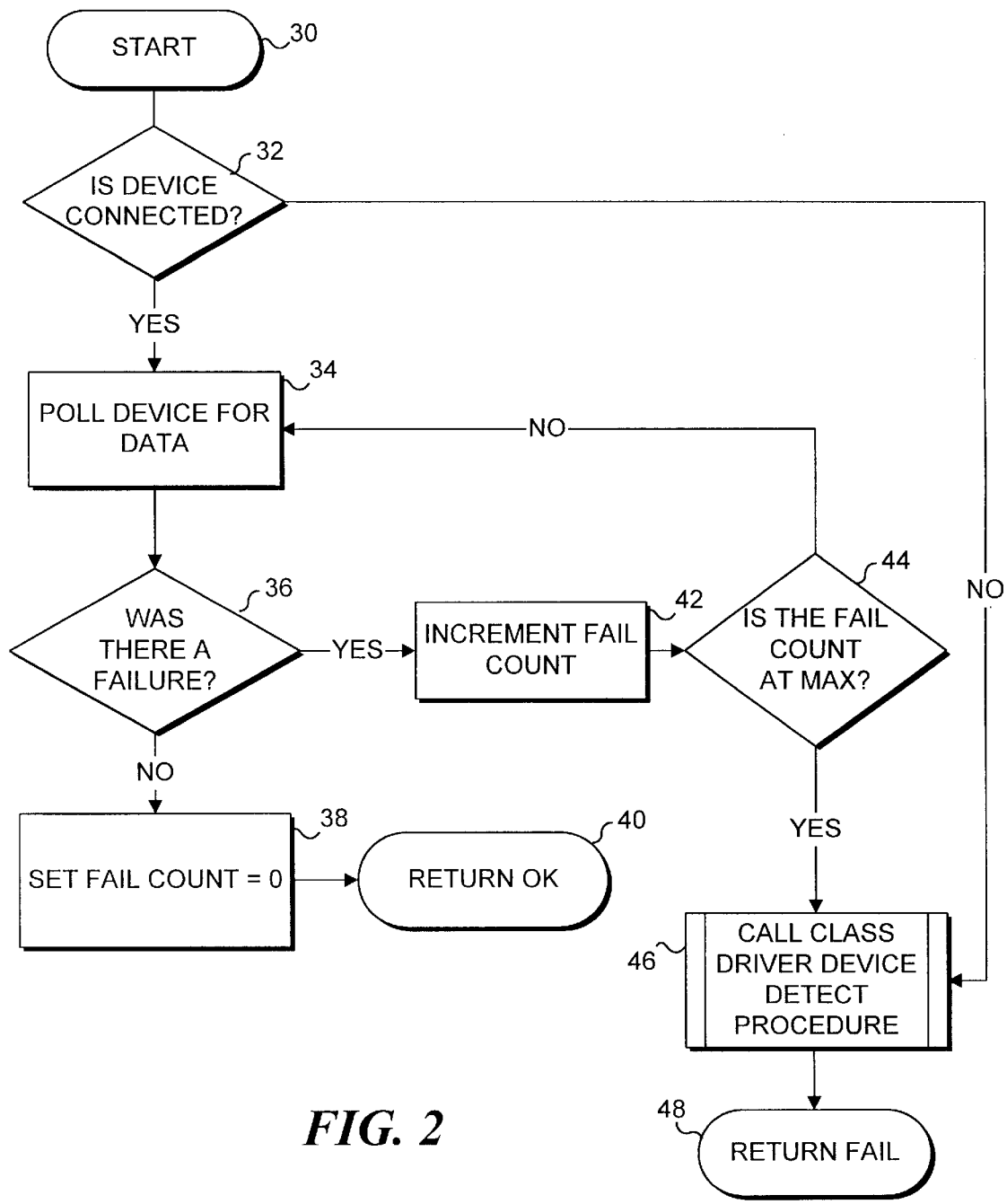
FIG. 2 is a flow chart showing an overview of the logic employed when polling the game port for data from the connected digital input device.

Turning now to FIG. 2, the steps employed in the class driver poll data procedure that is used for detecting a digital input device are illustrated. The procedure begins in a start block 30 and proceeds to a decision block 32, which determines if a digital input device is coupled to the game port (or serial or parallel port, depending upon the embodiment in use). If a digital input device is connected, a block 34 provides for polling the device for data. The digital game pads and digital joysticks marketed by Microsoft Corporation transmit packetized data to the game port, and block 34 provides for requesting packets of data from the digital device that is currently connected to the port. If more than one device is connected, e.g., multiple games pads connected in a daisy chain, the ID for the newly connected device will be transmitted to the personal computer in response to the polling request in block 34. Clearly, a different type of digital device that communicates in a different format will not respond properly to the polling attempt and neither will an analog input device.

A decision block 36 determines if there was a failure when the input device coupled to the port was polled. Failures may arise from transient causes such as parity errors, errors in the length of the packet, and the wrong bits in certain portions of the packet, even when a digital input device of the type expected responds to the polling request of block 34. An affirmative response to decision block 36 leads to a block 42, which increments a fail count. A decision block 44 determines if the fail count has reached a maximum predetermined value, e.g., three, and if not, proceeds back to block 34 to again poll the device for data. If the current attempt to poll the device for data is successful, the logic proceeds to a block 38 that sets the fail count to zero and then proceeds to a block 40, which returns "OK," indicating that communication with a digital device of the expected type that is connected to the port has been successful.

However, if the fail count is at the maximum predetermined value in decision block 44, the logic proceeds to a block 46, which calls a class driver device detect procedure, to determine if a different type of input device is connected to the game (or other port). Similarly, a negative response to decision block 32 also leads to block 46 in which the class driver detect procedure is called. After the call class driver detect procedure is completed, the logic proceeds to a block 48, returning a fail indication. It should be noted that even though a fail indication is returned in block 48, a game application or other type of application executing on the computer that requires an input device will most likely again check for a device that is connected to the appropriate port. However, the response of the application to be controlled by such a device to a fail indication depends upon the application and is independent of the present invention.

Figure 3:
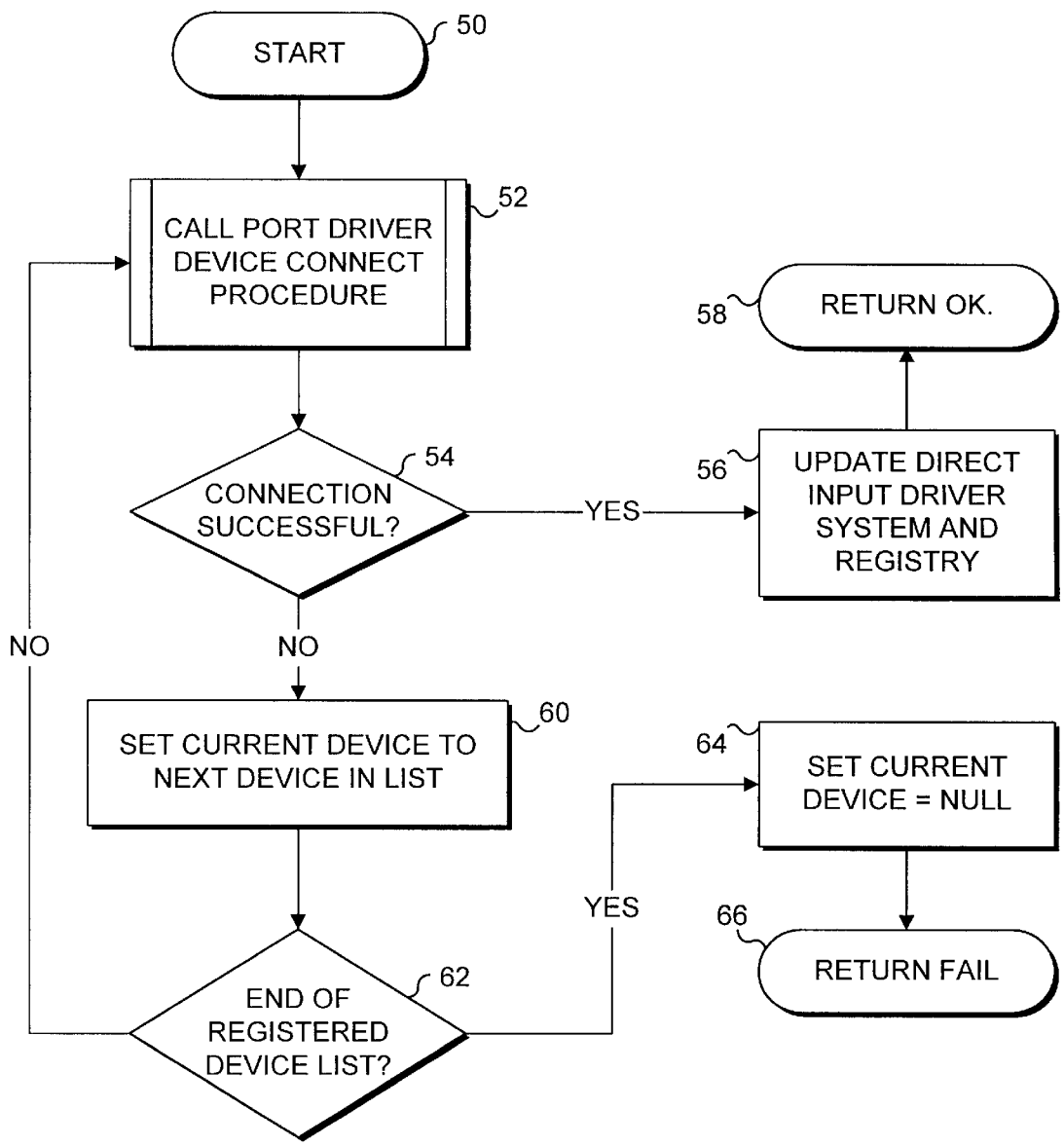
FIG. 3 is a flow chart illustrating the logic of a class driver device detect procedure used in the present invention.
Figure 4:
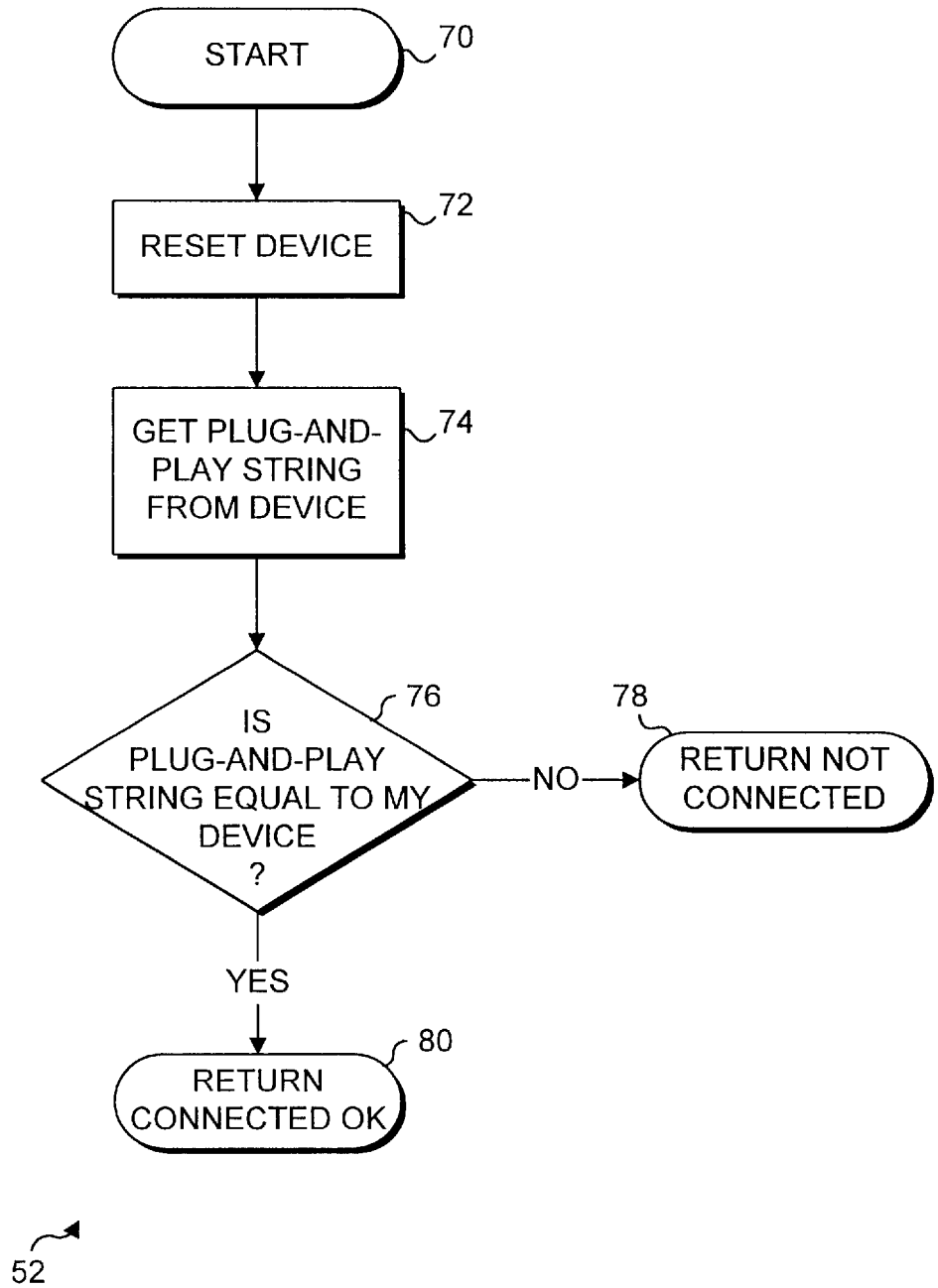
FIG. 4 is a flow chart of a port driver device connect procedure referenced in FIG. 3.

Details of the class driver device detect procedure referenced in block 46 of FIG. 2 are illustrated in the flow chart shown in FIG. 3, beginning with a start block 50. The first calls a "port driver device connect procedure" in a block 52. Referring to FIG. 4, details of this port driver device connect procedure are illustrated. The port driver device connect procedure proceeds from a start block 70 to a block 72 in which the device connected to the port is reset. Next, in a block 74, the logic attempts to obtain a plug-and-play string stored in the device. Each type of device should have a unique plug-and-play string identification. Thus, the digital game pads 26a through 26d (shown in FIG. 1) have one plug-and-play string, while the digital joystick has a different plug-and-play string. Next, in a decision block 76, the logic determines if the plug-and-play string that was obtained from the device is equivalent to the plug-and-play string for the current port driver (i.e., the current minidriver, such as "SWGAMPAD.VxD" or "SW3DPRO.VxD"). If so, a block 80 returns a "Connected OK" flag. However, if either an analog input device or a different type of digital input device is connected to the port so that the expected plug-and-play string in not returned, decision block 76 leads to a block 78, which returns a "Not Connected" flag, to indicate that the expected type of device is not connected to the port. Following either block 58 or block 66, the logic returns to the class driver detect procedure in FIG. 3.

Referring back to FIG. 3, after completing the port driver device connect procedure, a decision block 54 determines which message was returned. If the connection was made to an expected digital input device, the logic proceeds to a block 56, which updates the direct input driver system and the registry of the operating system to reflect the type of device that is currently connected to the port. The logic then proceeds to a block 58, which returns an "OK" indicating that the direct input driver and system registry have been updated.

However, a negative response to decision block 54 leads to a block 60 to set the current device to the next type of device in the list. Currently, only two types of digital input devices exist in the list—the digital game pad and the digital joystick. However, it is contemplated that additional types of digital input devices will be developed in the future, each having a different plug-and-play string associated with it and each possibly employing a different mini (port) driver. A decision block 62 determines if the end of the registered device list has been reached, and if not, the logic returns to block 52 to call the port driver device connect procedure for the now current device in the list of digital input devices.

If the end of the registered device list has been reached in decision block 62, the logic proceeds to a block 64. In block 64, the current device is set to a null, indicating that no digital device (or at least none in the list) is connected to the port. A block 66 then returns a fail for the class driver device detect procedure.

In summary, it will be apparent that the preceding logic automatically detects the type of digital device newly connected to a computer through a game port (or through the serial port or parallel port), provides for registering the device, and insures that it is matched to the current mini driver for the device. If a device that is not in the list of digital devices that might be connected to the port is coupled to the game port, or if an analog input device is connected, control is turned over to the application executing on the computer that requires the input to determine the type of device that has been connected and to load the appropriate drivers for it, and any of the drivers previously loaded for a digital device that is now disconnected are unloaded from the system. By responding to changes in the types of devices that are connected to the game port, serial port, or parallel port of a computer, the present invention greatly simplifies the handling of input from such devices, since the changes are handled "hot," without requiring any action on the part of the user to specifically indicate which type of device has been connected or disconnected. Only those devices that are not digital and are not included in the list of possible digital devices that can be connected will require that the user become involved, to indicate the type of device that is connected and possibly to recalibrate the device if the input device is analog.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for automatically reconfiguring an operating system of a computer after any of a plurality of different types of player actuated digital input devices is coupled to or decoupled from a port of the computer, where said port is one of an RS-232 serial port, a parallel port, and a game port, comprising the steps of:

(a) providing a software interface that universally accepts input signals applied to the port by each of the different types of digital input devices;

(b) automatically detecting each of the digital input devices currently coupled to the port and automatically identifying its type from among the plurality of different types; and (c) without requiring that the computer be rebooted, processing the input signal received through the port from each digital input device that is thus detected as appropriate for said type of digital input device, to provide an application input signal.

2. The method of claim 1, wherein the plurality of different types of digital input devices that are automatically detected include a digital joystick and a digital game pad.

3. The method of claim 1, wherein the step of automatically identifying comprises the steps of:

(a) polling each digital input device coupled to the port using a defined format that is used for communication by a specific type of digital input device;

(b) if the step of polling fails to elicit an identification of the specific type of digital input device being polled, returning a fail indication; and (c) if the step of polling elicits the identification of the specific type of the digital input device being polled, employing a driver corresponding to said specific type of digital input device, for processing the input signal from the specific type of digital input device.

4. The method of claim 3, wherein the polling is repeated a predefined number of times or until the identification is elicited, whichever occurs first.

5. The method of claim 1, wherein up to a predefined number of digital input devices of a specific type can be coupled to the port.

6. The method of claim 1, wherein an operating system running on the computer stores the identification for each digital input device that is currently coupled to the port.

7. The method of claim 1, further comprising the step of determining when an input device that is not among the plurality of different types of digital input devices is coupled to the port.

8. The method of claim 1, wherein the digital input devices are coupled in a daisy chain configuration, a first of the digital input devices being directly coupled to the port, and each successive digital input device being coupled to a port disposed on a previous digital input device in the daisy chain configuration.

9. The method of claim 8, wherein the interface software communicates with each digital input device coupled in the daisy chain configuration without regard to a relative position of the digital input device in the daisy chain configuration.

10. The method of claim 8, further comprising the step of responding to a mode switch on the first of the digital input devices to indicate that a second input device, which is coupled to the first digital input device, is providing the input signal.

11. The method of claim 10, wherein an input device coupled to the first of the digital input devices is automatically detected, but its type is not identified if the input device is not one of the plurality of different types of digital input devices.

12. An apparatus for automatically communicating with any of a plurality of different types of player actuated digital input devices that are coupled to or decoupled from a port of a computer, where the port is one of an RS-232 serial port, a parallel port, and a game port, comprising:

(a) a processor for executing machine instructions that comprise an operating system, said machine instructions further comprising a software driver interface that universally accepts input signals applied to the port by the plurality of different types of digital input devices;

(b) a memory coupled to the processor, for storing the machine instructions; and (c) said machine instructions causing the processor to:
  (i) automatically detect each digital input device currently coupled to the port and automatically identify its type; and
  (ii) without requiring that the computer be rebooted, process the input signal received through the port from each digital input device detected, as appropriate for said type of digital input device, to provide an application input signal to an application being executed by the processor.

13. The apparatus of claim 12, wherein the plurality of different types of digital input devices that are automatically detected include a digital joystick and a digital game pad.

14. The apparatus of claim 12, wherein the machine instructions of the software interface further cause the processor to:
  (a) poll each digital input device coupled to the port using a defined format that is used for communication by a specific type of digital input device;
  (b) if the polling fails to elicit an expected response from the digital input device being polled, returning a fail indication; and
  (c) if the polling elicits the expected response from the digital input device being polled, employing a driver included within the machine instructions, for processing the input signal from the specific type of digital input device.

15. The apparatus of claim 14, wherein the polling is repeated a predefined number of times or until the expected response from the digital input device is elicited, whichever occurs first.

16. The apparatus of claim 12, wherein up to a predefined number of digital input devices of a specific type can be coupled to the port.

17. The apparatus of claim 12, wherein the software interface comprising the machine instructions further cause the processor to determine when an input device that is not among the plurality of different types of digital input devices is coupled to the port.

18. The apparatus of claim 12, wherein the operating system stores an identification for each digital input device that is currently coupled to the port.

19. The apparatus of claim 12, wherein the digital input devices are connected in a daisy chain configuration, a first of the digital input devices being directly coupled to the port, and each successive digital input device being coupled to a port disposed on a previous digital input device in the daisy chain configuration.

20. The apparatus of claim 19, wherein the interface software causes the processor to communicate with each digital input device coupled in the daisy chain configuration without regard to a relative position of the digital input device in the daisy chain configuration.

21. The apparatus of claim 19, wherein the first of the digital input devices includes a mode switch, said interface software causing the processor to respond to a setting of the mode switch on the first of the digital input devices, said setting of the mode switch indicating that a second input device coupled to the first digital input device is providing the input signal.

22. The apparatus of claim 21, wherein the machine instructions cause the processor to automatically detect an input device that is coupled to the first of the digital input devices, but which is not one of the plurality of different types of digital input devices.

23. An article of manufacture for use with a computer, for causing the computer to respond automatically to a change of configuration after any of a plurality of different types of player actuated digital input devices is coupled to or decoupled from a port of the computer, where said port is one of an RS-232 serial port, a parallel port, and a game port, comprising:
  (a) memory medium for use with the computer; and
  (b) a plurality of machine instructions stored on the memory medium, said machine instructions comprising a software interface that universally accepts input signals applied to the port by each of the plurality of different types of digital input devices and causing the computer to:
    (i) automatically detect each digital input device currently connected to the port and automatically identify its type from among the plurality of different types; and
    (ii) without requiring the computer to be rebooted, process the input signal received through the port from each digital input device detected as appropriate for said type of digital input device, to provide an application input signal.

24. The article of manufacture of claim 23, wherein the plurality of different types of digital input devices that are automatically detected include a digital joystick, and a digital game pad.

25. The article of manufacture of claim 23, wherein the machine instructions further cause the computer to:
  (a) poll each digital input device coupled to the port using a defined format that is used for communication by a specific type of digital input device;
  (b) if the polling fails to elicit an expected response from the specific type of digital input device being polled, returning a fail indication; and
  (c) if the polling elicits the expected response from the specific type of digital input device being polled, employing a driver corresponding to the specific type of digital input device for processing the input signal from the specific type of digital input device.

26. The article of manufacture of claim 25, wherein the polling is repeated a predefined number of times or until the expected response is elicited, whichever occurs first.

27. The article of manufacture of claim 23, wherein there is a limit to the number of digital input devices of a specific type that can be coupled to the port.

28. The article of manufacture of claim 23, wherein the machine instructions cause an operating system running on the computer to store an identification for each currently active digital input device that is coupled to the port.

29. The article of manufacture of claim 23, wherein the machine instructions cause the computer to determine that an input device, which is not among the plurality of different types of digital input devices, has been coupled to the port.

30. The article of manufacture of claim 23, wherein the machine instructions cause the computer to respond to a mode switch disposed on a first of the digital input devices that are coupled to the port, said mode switch indicating that a second input device, which is coupled to the first digital input device, is providing the input signal.

31. The article of manufacture of claim 30, wherein the machine instructions cause the computer to automatically detect but not identify the type of an input device that is coupled to the first of the digital input devices, if the input device is not among the plurality of different types of digital input devices.

* * * * *